(12) United States Patent
Park et al.

(10) Patent No.: US 9,154,284 B1
(45) Date of Patent: Oct. 6, 2015

(54) ESTIMATING SOUNDING REFERENCE SIGNALS FOR SECONDARY RADIO-FREQUENCY CHANNELS

(71) Applicant: SPRINT COMMUNICATION COMPANY L.P., Overland Park, KS (US)

(72) Inventors: Sungki Park, Ashburn, VA (US); Brent Scott, Gardner, KS (US); Saied Kazeminejad, Ashburn, VA (US); Brett Christian, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 112 days.

(21) Appl. No.: 14/017,660

(22) Filed: Sep. 4, 2013

(51) Int. Cl.
*H04W 4/00* (2009.01)
*H04L 5/00* (2006.01)
*H04W 28/04* (2009.01)

(52) U.S. Cl.
CPC ............... *H04L 5/006* (2013.01); *H04W 28/04* (2013.01)

(58) Field of Classification Search
CPC ..................................................... H04W 28/04
USPC .......................................................... 370/329
See application file for complete search history.

(56) References Cited

U.S. PATENT DOCUMENTS

| | | | | |
|---|---|---|---|---|
| 2013/0114767 | A1* | 5/2013 | Lee et al. | 375/346 |
| 2013/0201912 | A1* | 8/2013 | Sheng et al. | 370/328 |
| 2014/0248917 | A1* | 9/2014 | Scipione et al. | 455/509 |

* cited by examiner

*Primary Examiner* — Christopher R Crompton

(57) ABSTRACT

A method, system, and medium are provided for approximating an uplink sounding reference signal for a secondary radio-frequency channel associated with an eNodeB in a long-term-evolution (LTE) network deploying carrier aggregation. This is useful when the eNodeB does not have an uplink channel associated with the secondary RF channel. The approximated uplink sounding reference signal is utilized by the eNodeB to determine downlink beamforming weights for the secondary RF channel.

20 Claims, 8 Drawing Sheets

ESTIMATING SOUNDING REFERENCE SIGNALS FOR SECONDARY RADIO-FREQUENCY CHANNELS

SUMMARY

A high level overview of various aspects of the invention is provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, computer-readable media, methods, and systems, for approximating an uplink sounding reference signal for a secondary radio-frequency channel associated with an eNodeB in a long-term-evolution (LTE) network deploying carrier aggregation. This is useful when the eNodeB does not have an uplink channel associated with a secondary RF downlink channel. The approximated uplink sounding reference signal is utilized by the eNodeB to determine downlink beamforming weights for the secondary RF channel.

BRIEF DESCRIPTION OF THE DRAWINGS

Illustrative embodiments of the present invention are described in detail below with reference to the attached drawing figures, and wherein.

DETAILED DESCRIPTION

Figure 1:
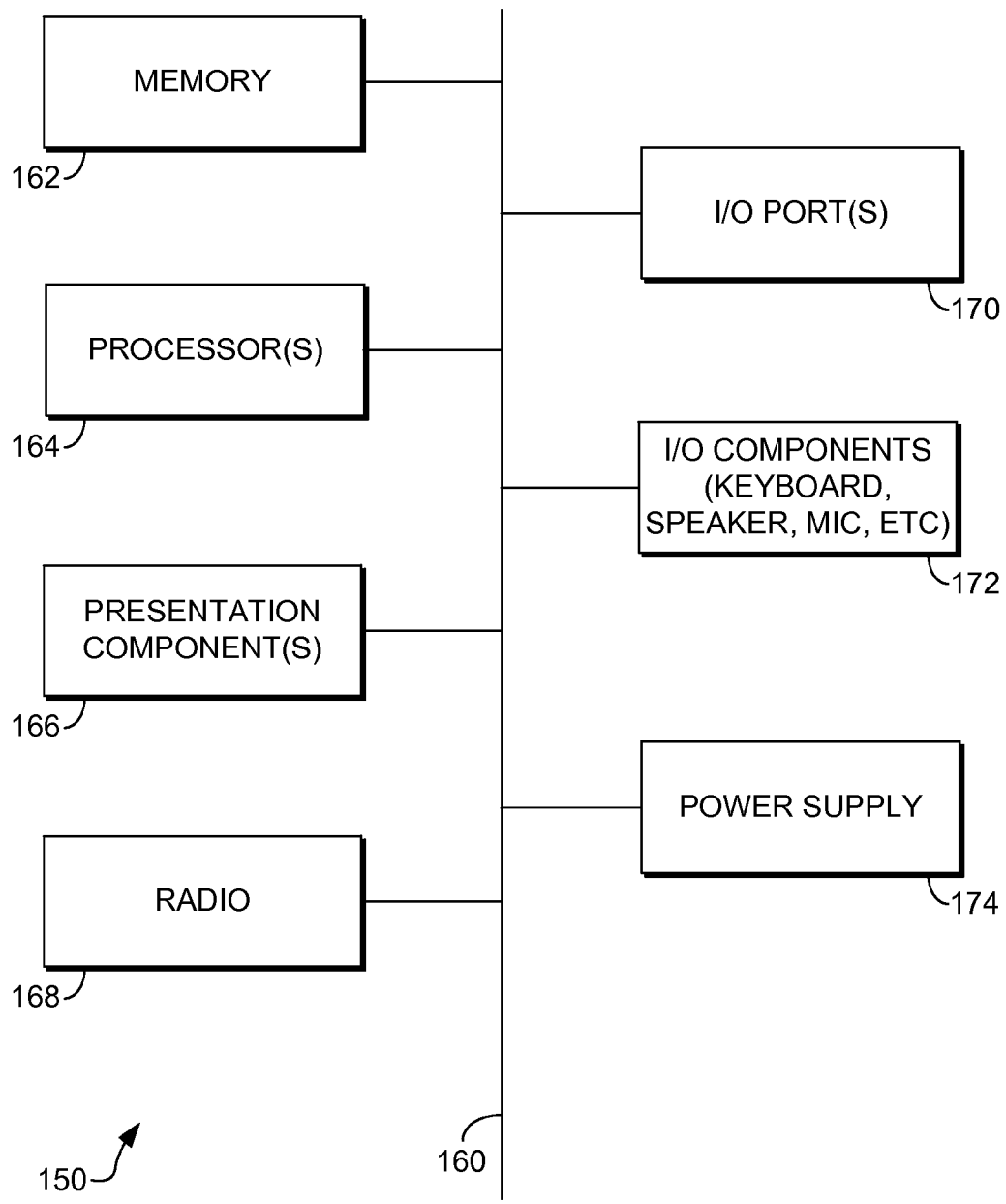
FIG. 1 depicts an exemplary mobile device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BF Beamforming
CA Carrier Aggregation
CDMA Code Division Multiple Access
CIR Channel Impulse Response
CQI Channel Quality Indicator
DL Downlink
eNodeB Evolved Node B
GIS Geographic Information System
2GPP $2^{nd}$ Generation Partnership Project
3GPP $3^{rd}$ Generation Partnership Project
GPRS General Packet Radio Service
GSM Global System for Mobile Communications
LTE Long-Term Evolution
RF Radio-Frequency
SRS Sounding Reference Signal
TDD Time Division Duplex
TDMA Time Division Multiple Access
TM Transmission Mode
UE User Equipment
UL Uplink
WCDMA Wideband Code Division Multiple Access Further, various technical terms are used throughout this description. An illustrative resource that fleshes out various aspects of these terms can be found in Newton's Telecom Dictionary, $27^{th}$ Edition (2012).

Embodiments of the present invention may be embodied as, among other things, a method, system, or set of instructions embodied on one or more non-transitory computer-readable or computer-storage media. Computer-readable media comprises physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to computer-storage media such as information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems, and computer-readable medium for estimating an UL SRS for one or more secondary RF channels associated with an eNodeB in a LTE network deploying carrier aggregation. As will be explained more fully below, the estimated UL SRS is used because LTE carrier-aggregation networks typically only utilize an uplink channel on the primary RF channel and not on secondary RF channels. The estimated UL SRS is used to determine DL BF weights for the secondary RF channels.

Accordingly, in a first aspect, the eNodeB receives on its primary UL channel a first UL SRS from a UE associated with the network. The eNodeB extracts a first CIR from the first UL SRS and uses the first CIR to determine DL BF weights for the primary RF channel. The eNodeB then uses either the first CIR or a long-term-average CIR associated with the primary RF channel to determine DL BF weights for the secondary RF channel.

In a second aspect, the eNodeB receives on its primary UL channel a first UL SRS from a UE associated with the network. A first CR is extracted from the first UL SRS by the eNodeB and is used to determine DL BF weights for the primary RF channel and the secondary RF channel. A first CQI is received from the UE for the primary RF channel, and a second CQI is received from the UE for the secondary RF channel. The absolute value of the difference between the first CQI and the second CQI is determined. When the absolute value is greater than a predetermined threshold, a long-term-average CIR of the primary RF channel is used to determine DL BF weights for the secondary RF channel. When the absolute value is less than the predetermined threshold, the eNodeB continues to use the first CIR to determine DL BF weights for the secondary RF channel.

In a third aspect, the eNodeB extracts a first CIR from a first UL SRS received from a UE on the eNodeB's primary UL channel. The eNodeB determines a long-term-average CIR for the primary RF channel. The eNodeB uses the first CR to determine DL BF weights for the primary RF channel and for the secondary RF channel. A first CQI is received from the UE for the primary RF channel, and a second CQI is received from the UE for the secondary RF channel. An absolute value of the difference between the first and second CQI is determined. When the absolute value is greater than a predetermined threshold, the long-term-average CIR is used to determine DL BF weights for the secondary RF channel, and when the absolute value is less than the predetermined threshold, the eNodeB continues to use the first CIR to determine the DL BF weights for the secondary RF channel. The long-term-average CIR is adjusted upward by an amount delta when the mathematical difference between the first CQI and the second CQI is greater than zero, and the long-term-average CIR is adjusted downward by the amount delta when the mathematical difference between the first CQI and the second CQI is less than zero. The adjusted long-term-average CIR is then used to determine the DL BF weights for the secondary RF channel when the absolute value of the difference between the first CQI and the second CQI is greater than the predetermined threshold.

Turning now to FIG. 1, a block diagram of an illustrative communications device or UE is provided and is referenced generally by the numeral 150. Although some components are shown in the singular, they may be plural. For example, the communications device 150 might include multiple processors or multiple radios, etc. As illustratively shown, the communications device 150 includes a bus 160 that directly or indirectly couples various components together including memory 162, a processor 164, a presentation component 166, a radio 168, input/output ports 170, input/output components 172, and a power supply 174.

The memory 162 might take the form of memory components previously described. Thus, further elaboration will not be provided here, only to say that the memory component 162 can include any type of medium that is capable of storing information (e.g., a database). A database can be any collection of records. In one embodiment, the memory 162 includes a set of embodied computer-executable instructions that, when executed, facilitates various aspects disclosed herein. These embodied instructions will variously be referred to as "instructions" or an "application" for short.

The processor 164 might actually be multiple processors that receive instructions and process them accordingly. The presentation component 166 includes the likes of a display, a speaker, as well as other components that can present information (such as a lamp (LED), or even lighted keyboards).

The radio 168 facilitates communication with a wireless-telecommunications-network. Illustrative wireless-telecommunications technologies include CDMA, EvDO, GPRS, TDMA, GSM, WiMax technology, LTE, LTE Advanced and the like. In some embodiments, the radio 168 might also facilitate other types of wireless communications including Wi-Fi®, Bluetooth® communications, GIS communications, and other near-field communications.

As way of background, specifications for LTE-Advanced provide for, among other things, increased carrying capacity and increased uplink and downlink data rates (e.g., downlink rates up to 1 Gbps) by aggregating RF spectrum bandwidth or RF channels to achieve up to a maximum bandwidth of 100 MHz. The aggregation of RF channels is known as carrier or channel aggregation (CA). Each RF channel has a specified bandwidth and up to five channels can theoretically be aggregated together although typically only two or three RF channels are aggregated together.

Figure 2A:
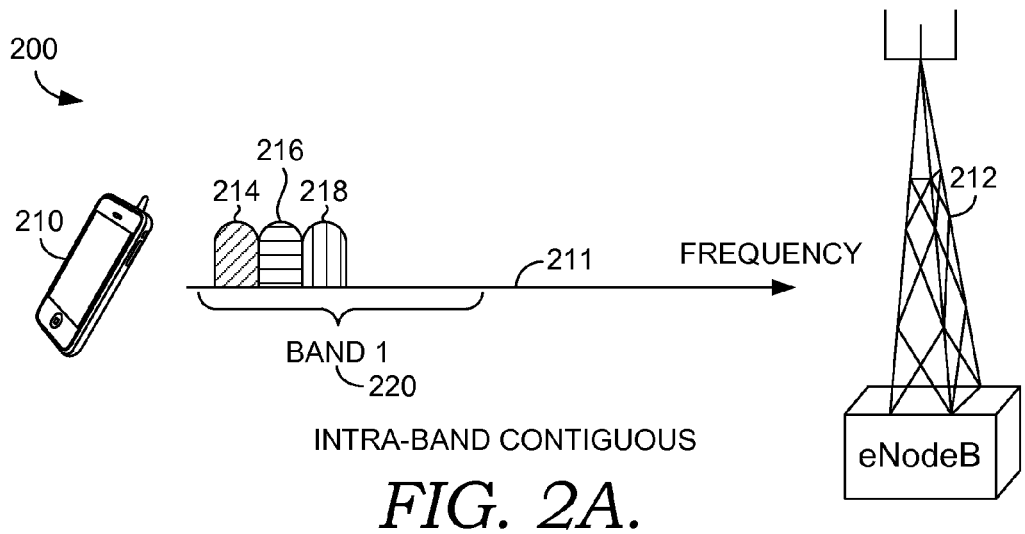
FIGS. 2A-2C depict exemplary intra- and inter-band radio-frequency spectrum arrangements in an LTE network deploying carrier aggregation suitable for practicing embodiments of the technology.
Figure 2B:
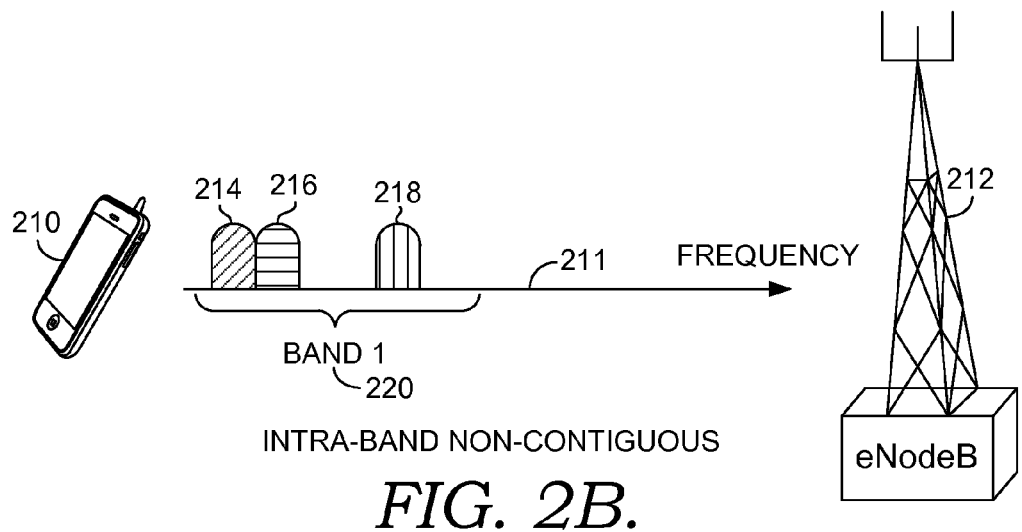
Figure 2C:
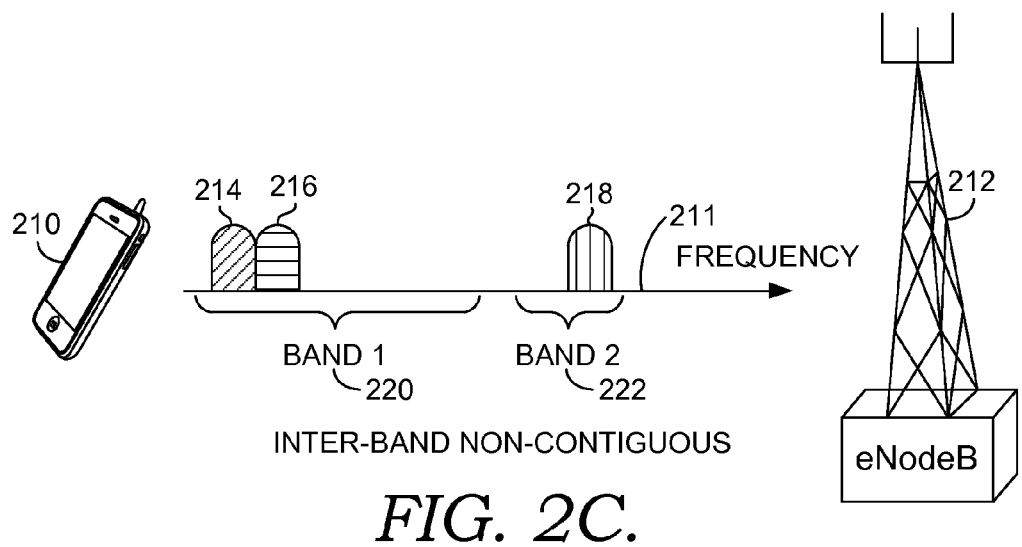

FIGS. 2A-2C depict several exemplary carrier aggregation scenarios involving three RF channels and are provided for illustration purposes. Additional aggregation scenarios having more or less RF channels than those shown in FIGS. 2A-2C are contemplated as being within the scope of the invention. FIGS. 2A-2C each depicts a UE 210, a wireless-telecommunications link 211 of one or more specified frequency bandwidths, and an eNodeB 212. The UE 210 may be the same as the communications device 150 of FIG. 1. The UE 210 may subscribe to voice and data services offered by a wireless-telecommunications-network (the "network"). As such, the UE 210 may be in communication with the network via the eNodeB 212. Communication between the UE 210 and the eNodeB 212 occurs through the wireless-telecommunications link 211. The UE 210 may communicate with the eNodeB 212 via the link 211 to facilitate attachment of the UE 210 to the eNodeB 212. Once attached, the UE 210 may also use the telecommunications link 211 to send and/or receive voice or data information.

The eNodeB 212 includes hardware and bandwidth(s) of a specified frequency. The hardware includes, for example, the actual radio mast or tower, as well as antennas, transceivers, GPS receivers, electrical power sources, digital signal processors, control electronics, and the like that are associated with the radio tower.

The RF spectrum bandwidth associated with the eNodeB 212 may comprise one or more RF channels. The RF channels are capable of carrying packet-switched technologies such as LTE as well as other technologies such as circuit-switched technologies, although only one type of technology is carried by an RF channel at a time. As mentioned, with carrier aggregation two or more of the RF channels can be aggregated together to achieve a greater RF spectrum bandwidth. The main channel in the aggregated group is known as the primary component carrier or primary RF channel and all other RF channels in the aggregated group are known as secondary component carriers or secondary RF channels. The determination of which RF channel is the primary RF channel is specific to the UE 210 and is determined based on the loading across the RF channels as well as other parameters. The primary RF channel has a primary DL channel and an associated UL channel. However, because consumer expectations are geared more towards faster downlink speeds as compared to uplink speeds, and because the transmission power of typical UEs is limited, most carrier-aggregation LTE networks do not implement UL channels on secondary RF channels. Therefore, secondary RF channels generally just have a DL channel and not an associated UL channel.

FIG. 2A illustrates a first aggregation scenario referred to as intra-band contiguous aggregation. In FIG. 2A contiguous (i.e., adjacent) RF channels within the same operating frequency band are aggregated together. For instance, with respect to FIG. 2A, RF channels 214, 216, and 218 are aggregated together; RF channels 214, 216, and 218 all operate within the same bandwidth—Band 1 220. FIG. 2B illustrates a second aggregation scenario known as intra-band non-contiguous aggregation. In this case, because the network's frequency allocation is fixed, the RF channels may belong to the same bandwidth but one or more of the RF channels may be separated by a frequency gap. For instance, with respect to FIG. 2B, RF channels 214 and 216 are contiguous but, because of the network's spectrum allocation, are separated by a frequency gap from RF channel 218. All of the RF channels 214, 216, and 218 operate within Band 1 220. FIG. 2C illustrates a third aggregation scenario known as inter-band non-contiguous aggregation. In this scenario one or more of the RF channels operate within a different frequency bandwidth. Thus, in FIG. 2C, RF channels 214 and 216 are contiguous and operate within Band 1 220 while RF channel 218 operates within a different frequency bandwidth—Band 2 222.

Figure 3A:
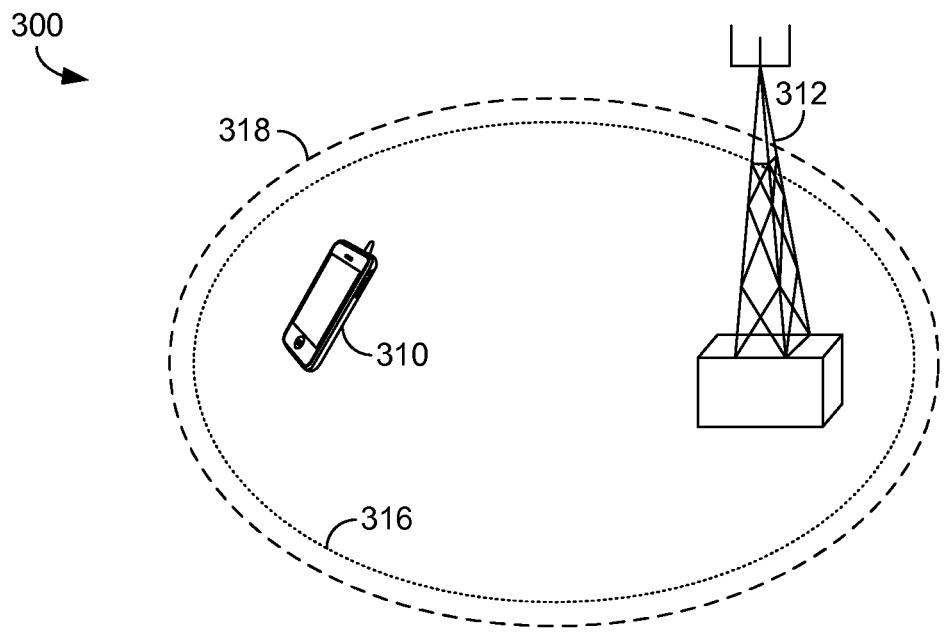
FIGS. 3A-3B depict exemplary radio-frequency coverage patterns in an LTE network deploying carrier aggregation suitable for practicing an embodiment of the technology.

When carrier aggregation is used, each RF channel in the aggregated group may cover a different serving cell. This is due to the frequency associated with each of the RF channels as well as other factors. FIG. 3A depicts an example of serving cells associated with intra-band contiguous or non-contiguous aggregation. FIG. 3A includes a UE 310, an eNodeB 312, a serving cell 316 associated with a primary RF channel, and a serving cell 318 associated with a first secondary RF channel. The UE 310 and the eNodeB 312 may be the same as the UE 210 and the eNodeB 212 of FIGS. 2A-2C. As seen, because the primary RF channel and the first secondary RF channel operate within the same bandwidth, the serving cells 316 and 318 that serve the UE 310 are similar in size.

Figure 3B:
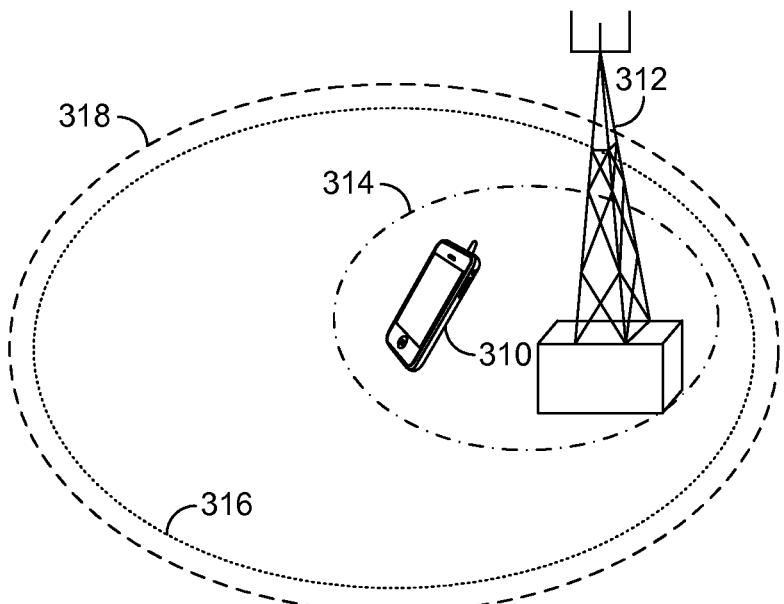

FIG. 3B depicts an example of serving cells associated with an inter-band non-contiguous aggregation scenario. FIG. 3B includes the UE 310, the eNodeB 312, the serving cell 316 associated with the primary RF channel, and the serving cell 318 associated with the first secondary RF channel. FIG. 3B also includes a third serving cell 314 associated with an additional secondary RF channel that operates within a different frequency band than the primary RF channel or the first secondary RF channel. Because it operates within a different frequency bandwidth, the additional secondary RF channel has a different path loss profile as compared to the other RF channels and, thus, a different-sized serving cell.

Specifications for LTE-Advanced also provide for increased cell capacity and throughput by utilizing multi-antenna techniques such as beamforming (BF). LTE defines several DL transmission modes that support beamforming such as TM7 and TM8; TM7 supports single layer BF, and TM8 supports dual layer BF. At a high level, BF is used by the eNodeB to maximize signal power in the direction of a first UE. Signal power is maximized or optimized by adjusting the phase and amplitude of the beam. This is known as BF weighting. Optimal eNodeB DL BF weighting is primarily driven by knowledge of the UL channel within the serving cell. For a primary RF channel associated with the eNodeB, the UL channel can be estimated based on an UL SRS communicated by the UE to the eNodeB on the primary RF channel's UL channel. However, as discussed above with respect to carrier aggregation, typically only the primary RF channel has an UL channel while the secondary RF channels only have DL channels and not associated UL channels. Thus, because there are not UL channels associated with secondary RF channels, the eNodeB is unable to obtain UL SRSs from the UE for these secondary RF channels. The present invention provides for ways to estimate an UL SRS for a secondary RF channel.

Figure 5:
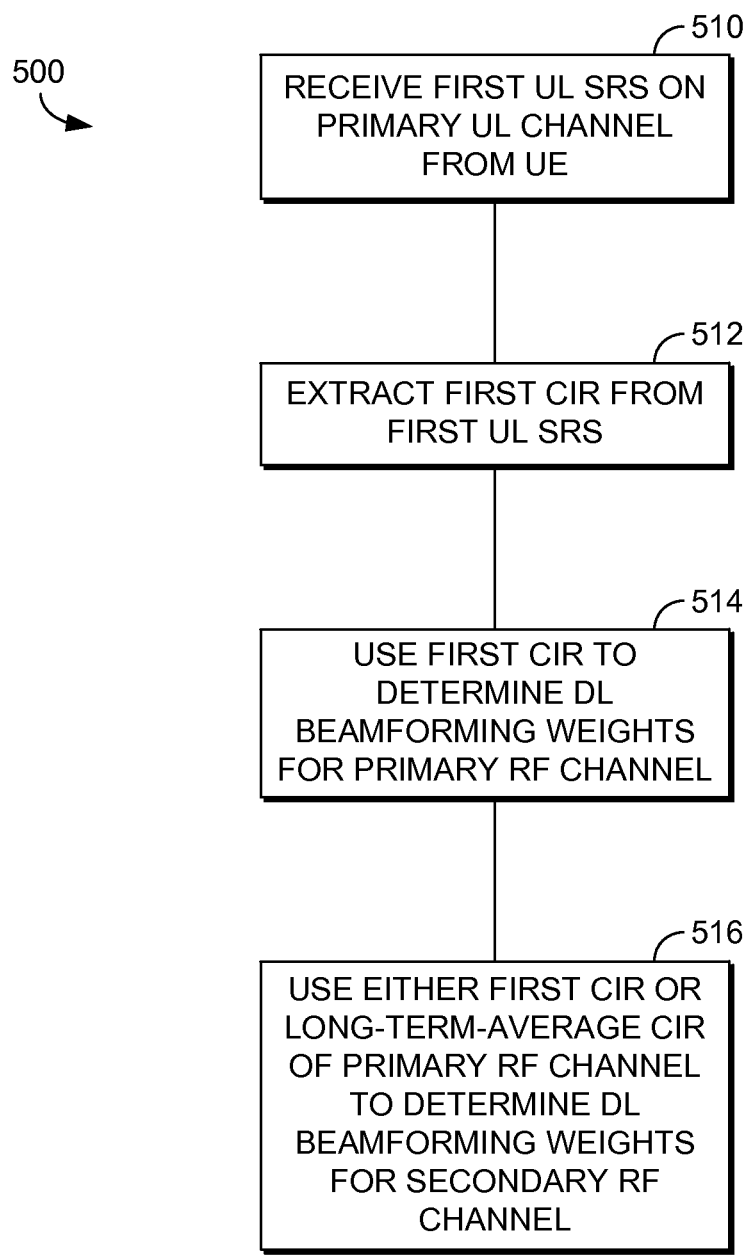
FIGS. 5-7 depict illustrative flow diagrams of exemplary methods of estimating an uplink sounding reference signal for a secondary radio-frequency channel in an LTE network deploying carrier aggregation according to embodiments of the technology.

Turning now to FIG. 5, a flow diagram is depicted of an exemplary method 500 of estimating an UL SRS for a secondary RF channel associated with an eNodeB in a LTE network deploying carrier aggregation. The eNodeB has a primary RF channel having a primary DL channel and an associated UL channel. The eNodeB also has one or more secondary RF channels that only have a DL channel and not an associated UL channel.

At a step 510, the eNodeB receives an UL SRS from a UE associated with the network. The UL SRS is received on the eNodeB's primary UL channel. At a step 512, a channel impulse response (CIR) is extracted from the SRS. The CIR is a measure of the power level of the primary RF channel at the UE. At a step 514, the CIR is used by the eNodeB to determine DL BF weights (e.g., the phase and amplitude) for the primary DL channel.

Because there is not an UL channel associated with the eNodeB's secondary RF channel(s), the eNodeB will not receive an UL SRS from the UE on the secondary UL channel(s). Thus, at a step 516, the eNodeB uses either the instant CIR extracted from the UL SRS received on the primary UL channel or a long-term-average CIR associated with the primary RF channel to determine DL BF weights for the secondary RF channel(s). The instant CIR from the UL SRS received on the primary UL channel is used to determine the DL BF weights for the secondary DL channel when channel quality indicators (CQIs) received from the UE for the primary DL channel and the secondary DL channel indicate that the difference in channel quality between the primary DL channel and the secondary DL channel is less than a network-configured threshold. The difference in channel quality may be less than the network-configured threshold when, for example, the channels operate within the same band as shown by FIGS. 2A and 2B (intra-band contiguous and non-contiguous aggregation). On the other hand, the long-term-average CIR is used to determine DL BF weights for the secondary RF channel when the CQIs indicate that the difference in channel quality between the primary and secondary RF channels is greater than the network-configured threshold. The difference in channel quality may be greater than the network-configured threshold when the channels operate within different bands (e.g., inter-band non-contiguous aggregation), or when there is a large frequency gap between the channels even though they are operating within the same band (e.g., intra-band non-contiguous aggregation).

The long-term-average CIR is adjustable based on, for example, modifying the time span over which the CIR is measured for the primary RF channel. For instance, the time span over which the CIR is measured may be increased when the absolute value of the difference in CQIs between the primary RF channel and the secondary RF channel is larger than a predefined value. Alternatively, the time span over which the CIR is measured may be decreased when the absolute value of the difference in CQIs between the primary RF channel and the secondary RF channel is less than the predefined value. In one aspect of the invention, the predefined value is 5, although other predefined values are contemplated as being within the scope of the invention. The long-term-average CIR may also be increased or decreased by an amount delta that reflects a power quantity associated with the eNodeB. This will be explained in greater depth below. After adjustment, the adjusted long-term-average CIR may be used to re-determine BF weights for the secondary DL channel.

Figure 6:
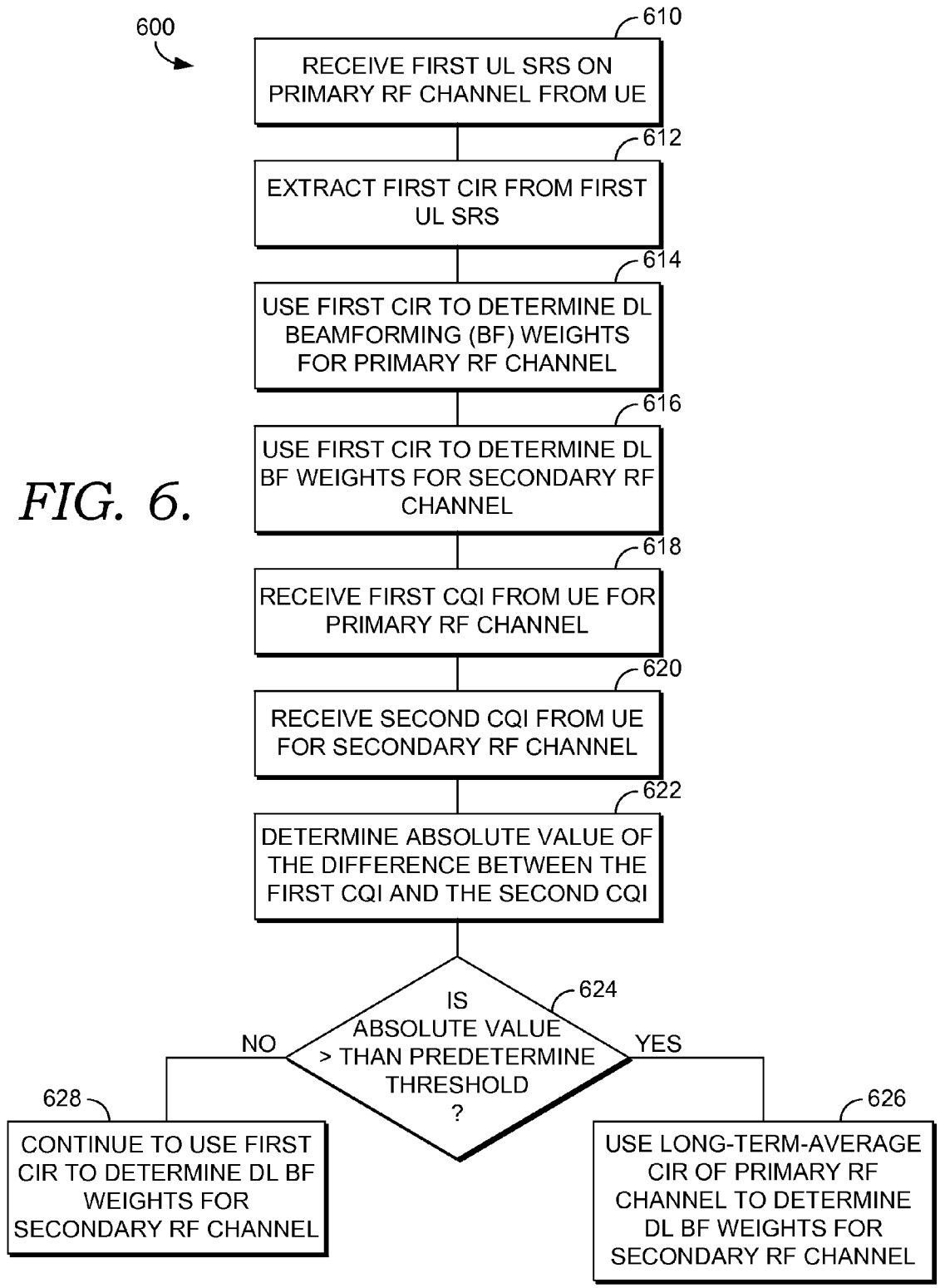

FIG. 6 depicts another flow diagram of an exemplary method 600 of estimating an UL SRS for a secondary RF channel associated with an eNodeB in a LTE network deploying carrier aggregation. The eNodeB has a primary RF channel having a primary DL channel and an associated UL channel. The eNodeB also has one or more secondary RF channels that only have a DL channel and lack an associated UL channel. At a step 610, a first UL SRS is received on the eNodeB's primary UL channel; the UL SRS is received from a UE attached to the eNodeB. At a step 612, a CIR is extracted from the first UL SRS and, at a step 614, the CIR is used to determine DL BF weights for the primary RF channel. At a step 616, the CIR is used to determine DL BF weights for the secondary RF channel.

At a step 618, subsequent to using the first CIR to determine DL BF weights for the primary and secondary RF channels, a first CQI is received from the UE for the primary DL channel, and, at a step 620, a second CQI is received from the UE for the secondary DL channel. At a step 622, the absolute value of the difference between the first CQI and the second CQI is determined. This may be expressed mathematically by the following formula:

$$|CQI_{Primary\ RF\ Channel} - CQI_{Secondary\ RF\ Channel}|$$

At a step 624, a determination is made whether the absolute value of the difference between the first CQI value and the second CQI value is greater than a predetermined or network-configured threshold. When, at a step 626, it is determined that the absolute value of the difference is greater than the predetermined threshold, then the long-term-average CIR associated with the primary RF channel is used to determine the DL BF weights for the secondary RF channel. In effect, the long-term-average CIR of the primary RF channel is used as a proxy metric for the long-term-average CIR of the secondary RF channel. the substitution of the long-term-average CIR of the primary RF channel for that of the long-term-average CIR of the secondary RF channel is based on the assumption that the long-term-average CIR for the primary RF channel is similar to the long-term-average CIR for the secondary RF channel.

Figure 4:
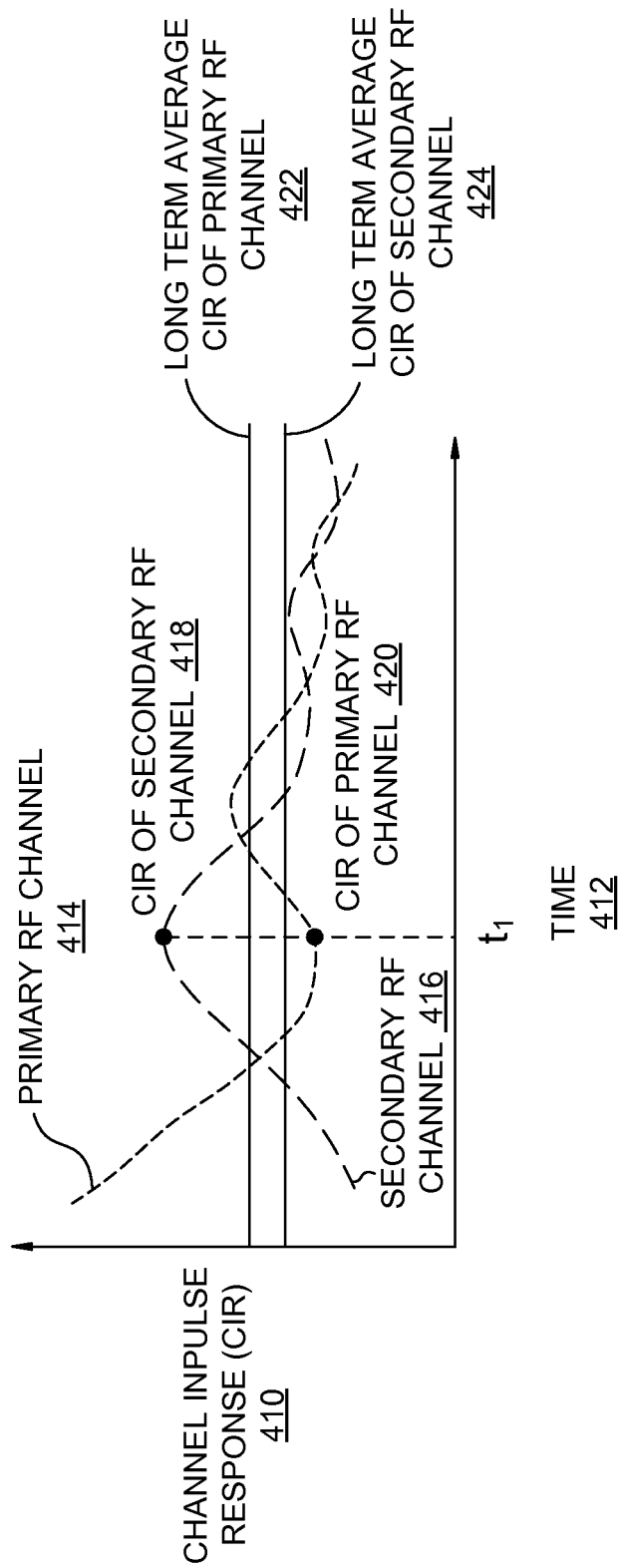
FIG. 4 depicts an exemplary graph illustrating the similarity between the long-term-average channel impulse response for an eNodeB's primary radio-frequency channel and the long-term-average channel impulse response for the eNodeB's secondary radio-frequency channel according to an embodiment of the technology.

An exemplary graph that illustrates the similarity between the long-term-average CIR of the primary and secondary RF channels is shown in FIG. 4. FIG. 4 illustrates a graph 400 having time 412 along the x-axis and CIR 410 along the y-axis. Line 414 illustrates the changing nature of the CIR of the primary RF channel over time. This may be due to varying channel conditions, and/or movement of the UE in the network. Likewise, line 416 illustrates the changing nature of the CIR of the secondary RF channel over time. As seen at, for example, time $t_1$ the CIR of the secondary RF channel 418 differs significantly from the CIR of the primary RF channel 420. However, as shown, at other times the CIR of the primary RF channel closely approximates the CIR of the secondary RF channel. Line 422 depicts the long-term-average CIR of the primary RF channel, and line 424 depicts the long-term-average CIR of the secondary RF channel. As seen in FIG. 4, these two values closely approximate each other thereby enabling the substitution of the long-term-average of the primary RF channel for that of the secondary RF channel when the secondary RF channel lacks an UL channel.

Turning back to FIG. 6, when, at a step 628, it is determined that the absolute value of the difference between the first CQI and the second CQI values is less than the predetermined threshold, the first CIR continues to be used to determine the DL BF weights for the secondary RF channel. This is based on the assumption that a small difference in channel quality (as indicated by the CQI values) between the primary and secondary DL channels indicates that the first CIR provides a good approximation for determining DL BF weights for the secondary RF channel. Thus, there is no need to use the long-term-average CIR of the primary RF channel as a proxy metric.

Figure 7:
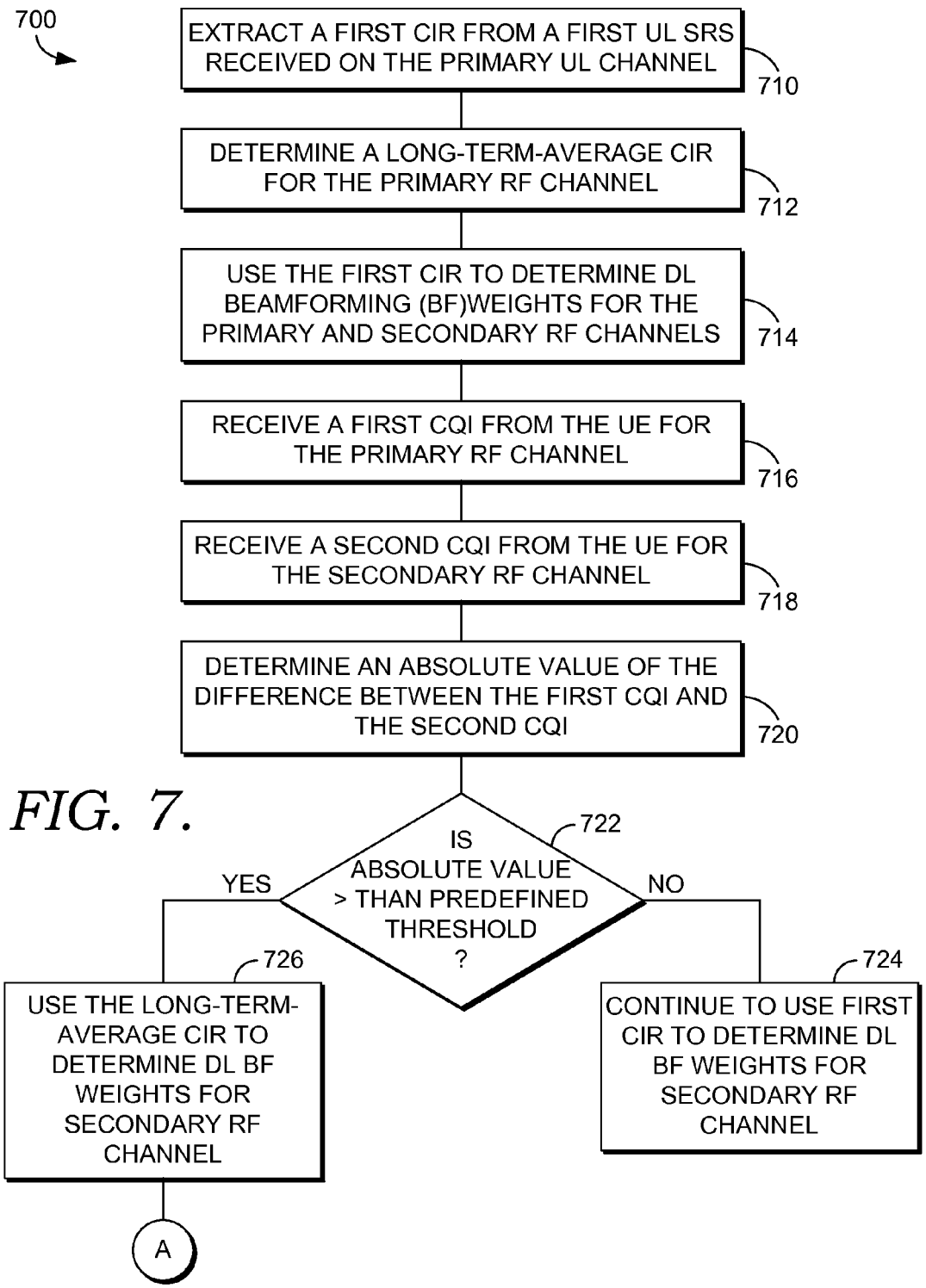
Figure 7:
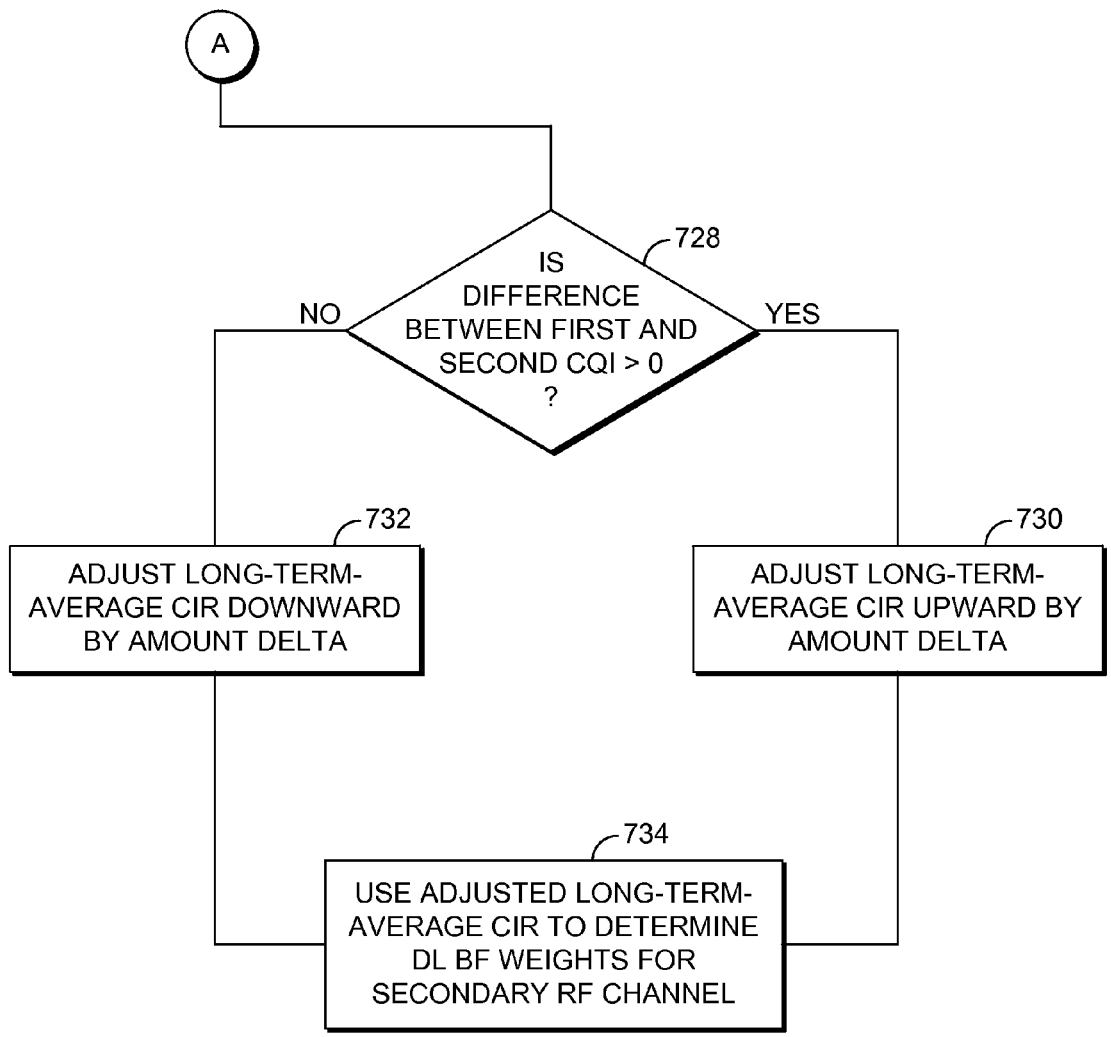

Turning now to FIG. 7, a flow diagram is depicted of an exemplary method 700 of estimating an UL SRS for a secondary RF channel associated with an eNodeB in an LTE network deploying carrier aggregation. The eNodeB has a primary RF channel having a primary DL channel and an associated UL channel. The eNodeB also has one or more secondary RF channels that only have a DL channel and not an associated UL channel.

At a step 710, a first CIR is extracted from a UL SRS received from a UE on the eNodeB's primary UL channel. At a step 712, a long-term-average CIR for the primary RF channel is calculated over a first time frame. The time frame over which the long-term-average CIR is calculated may subsequently be adjusted depending on CQIs received from the UE for the primary and secondary RF channels. This will be explained in greater depth below.

At a step 714, the first CIR is used to determine DL BF weights for both the primary RF channel and the secondary RF channel. At a step 716, a first CQI is received from the UE for the primary DL channel, and, at a step 718, a second CQI is received from the UE for the secondary DL channel. At a step 720, the absolute value of the difference between the first CQI and the second CQI is determined. At a step 722, it is determined whether the absolute value is greater than a predetermined or network-configured threshold. When, at a step 724, it is determined that the absolute value of the difference is less than the predetermined threshold, then the first CIR continues to be used to determine the DL BF weights for the secondary RF channel. Alternatively, when, at a step 726, it is determined that the absolute value of the difference is greater than the predetermined threshold, then the long-term-average CIR determined at step 712 is used to determine DL BF weights for the secondary RF channel.

As mentioned earlier, the long-term-average CIR is adjustable by, for example, modifying the time frame over which the CIR is calculated or by taking into account a correction factor, delta. Thus, at a step 728, a determination is made whether the mathematical difference between the first CQI and the second CQI is greater than zero (e.g., $CQI_1 - CQI_2 > 0$). When, at a step 730, it is determined that the mathematical difference is greater than zero, then the long-term-average CIR is adjusted upward by an amount delta. Alternatively, when, at a step 732, it is determined that the mathematical difference is less than zero (e.g., $CQI_1 - CQI_2 < 0$), then the long-term-average CIR is adjusted downward by the amount delta.

Delta may be calculated in a variety of ways. In one aspect, delta is calculated by using the signal strength as indicated by the UL SRS received from the UE on the primary UL channel and modifying it by a network-configurable parameter. This is mathematically shown by the following formula:

$$\Delta = |\alpha \cdot \hat{h}|^2, \ \hat{h} = E[y \cdot x^T], \ y = h^* x + n \qquad \text{(Formula 1)}$$

where $\alpha$ is the network-configurable parameter, $\hat{h}$ is a channel impulse response estimate based on the UL SRS, h is the channel impulse response, y is the received SRS sequence, x is the transmitted SRS sequence, and n is channel noise.

In another aspect, delta is calculated by applying the power of the UL SRS signal with a modification as shown by Formula 2 below:

$$\Delta = \alpha \cdot p, \ p = 1/N \sum_{n=0}^{N-1} x^2[n] \qquad \text{(Formula 2)}$$

where $\alpha$ is the network-configurable parameter used in Formula 1, N is the sample size, and x[n] is the transmitted SRS sequence which can be expressed mathematically by the formula:

$$x[n]=e^{jcn}zc_u(\mathrm{mod}(n,N_{zc})) \quad \text{(Formula 3)}$$

where $j=\sqrt{-1}$, c is the cyclic shift, $$zc_u(n) = e^{-j\frac{u\pi(n+1)}{N_{ZC}}};$$

$0 \leq n \leq N_{ZC}-1$, n is the sample size, u is the sequence index, and $N_{ZC}$ is the length of the sequence.

In a third aspect, delta is calculated by applying the power of the received traffic signal on the primary UL channel. This is shown by the following formula:

$$\Delta=p,\ p=\lim_{T\to\infty}1/T\!\int_{-T/2}^{T/2}x^2(t)dt,\ x(t)=e^{-j2\pi f_\Delta t} \quad \text{(Formula 4)}$$

where x(t) is the traffic signal received at time t, N is the sample size, $j=\sqrt{-1}$, $f_A=|C1-C2|$, and $e^{-j2\pi f_\Delta t}=\cos(2\pi f_A t)-j\sin(2\pi f_A t)$.

At a step 734 in the method 700, the adjusted long-term-average CIR calculated at steps 730 or 732 is used to determine the DL BF weights for the secondary RF channel. Step 734 is executed when the absolute value of the difference between the first CQI and the second CQI is greater than the predetermined threshold.

As mentioned earlier, the long-term-average CIR can also be adjusted by increasing or decreasing the time frame over which the CIR is measured. With respect to this aspect, when the absolute value of the difference between the first CQI value and the second CQI value is greater than a predefined value such as 5, the time frame is increased by a certain percentage. On the other hand, when the absolute value of the difference between the first CQI value and the second CQI value is less than the predefined value, the time frame is decreased by a certain percentage. For instance, the time frame window may be adjusted by +/−5 milliseconds, +/−10 milliseconds, or +/−20 milliseconds. Thus, the time frame window may be adjusted to a maximum of +/−50%. The adjustment may be carried out linearly or exponentially. Any and all such aspects, and any variation thereof, are contemplated as being within the scope of the invention. Once the time frame has been adjusted, the long-term-average CIR is re-calculated and is subsequently used to determine DL BF weights for the secondary RF channel.

The methods 500, 600 and 700 can be used when more than two RF channels are aggregated on the eNodeB. For example, when there is a third RF channel that has a DL channel but lacks an associated UL channel, the CIR extracted from the UL SRS received on the primary UL channel is initially used to determine DL BF weights for the third RF channel. A third CQI is received from the UE for the third DL channel, and the absolute value of the difference between the first CQI and the third CQI is determined. When the absolute value of the difference between the first and third CQI values is greater than the predetermined threshold, then the long-term-average CIR of the primary RF channel is used to determine the DL BF weights for the third RF channel. When the absolute value of the difference between the first and third CQI values is less than the predetermined threshold, then the first CIR continues to be used to determine DL BF weights for the third RF channel.

Many different arrangements of the various components depicted, as well as components not shown, are possible without departing from the scope of the claims below.

Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more nontransitory computer-readable media having computer-executable instructions embodied thereon that, when executed by a computing device, cause the computing device to perform a method of estimating an uplink (UL) sounding reference signal (SRS) for a secondary radio-frequency (RF) channel associated with an eNodeB in a carrier-aggregation (CA) long-term evolution (LTE) network (the "network"), wherein the eNodeB has at least a primary RF channel having a primary downlink (DL) channel and an associated primary UL channel and the secondary RF channel which only has a secondary DL channel and not an associated secondary UL channel, the method comprising:
   at the eNodeB
      receiving on the primary UL channel a first UL SRS from a user equipment (UE) associated with the network;
      extracting a first channel impulse response (CR) from the first UL SRS, the first CIR associated with the primary RF channel;
      using the first CIR to determine DL beamforming (BF) weights for the primary RF channel; and
      using at least one of the first CR or a long-term-average CIR associated with the primary RF channel to determine DL BF weights for the secondary RF channel, wherein a selection between using the first CIR or the long-term-average CR is based on a difference in channel quality between the primary DL channel and the secondary DL channel.

2. The media of claim 1, wherein the DL BF weights are associated with at least an amplitude and a phase.

3. The media of claim 1, wherein the first CIR is used to determine the DL BF weights for the secondary RF channel when channel quality indicator (CQI) values received from the UE for the primary DL channel and the secondary DL channel indicate that the difference in channel quality between the primary DL channel and the secondary DL channel is less than a predetermined threshold.

4. The media of claim 3, wherein the long-term-average CIR is used to determine the DL BF weights for the secondary RF channel when the CQI values received from the UE for the primary DL channel and the secondary DL channel indicate that the difference in channel quality between the primary DL channel and the secondary DL channel is greater than the predetermined threshold.

5. The media of claim 4, wherein the long-term-average CIR is adjustable.

6. The media of claim 5, wherein the long-term-average CIR is adjusted based on an estimated signal strength of the primary RF channel.

7. The media of claim 5, wherein the long-term-average CIR is adjusted by modifying a time span over which the long-term-average CIR is calculated.

8. A computerized method carried out by at least one processor for performing a method of estimating an uplink (UL) sounding reference signal (SRS) for a secondary radio-frequency (RF) channel associated with an eNodeB in a carrier aggregation (CA) long-term evolution (LTE) network (the "network"), wherein the eNodeB has at least a primary RF channel having a primary downlink (DL) channel and an associated primary UL channel and the secondary RF channel which only has a secondary DL channel and not an associated secondary UL channel, the method comprising:

at the eNodeB:
receiving on the primary UL channel a first UL SRS from a user equipment (UE) associated with the network;
extracting a first channel impulse response (CIR) from the first UL SRS, the first CIR associated with the primary RF channel;
using, utilizing the at least one processor, the first CIR to determine DL beamforming (BF) weights for the primary RF channel;
initially using, utilizing the at least one processor, the first CIR to determine DL BF weights for the secondary RF channel;
receiving a first channel quality indicator (CQI) value from the UE for the primary DL channel;
receiving a second CQI value from the UE for the secondary DL channel; and
determining the absolute value of the difference between the first CQI value and the second CQI value, wherein:
when the absolute value is greater than a predetermined threshold, using a long-term-average CIR of the primary RF channel to determine the DL BF weights for the secondary RF channel, and
when the absolute value is less than the predetermined threshold continuing to use the first CIR to determine DL BF weights for the secondary RF channel.

9. The computerized method of claim 8, further comprising failing to receive a second UL SRS from the UE for the secondary RF channel.

10. The computerized method of claim 9, wherein the predetermined threshold is configured by the network.

11. The computerized method of claim 9, wherein the long-term-average CIR is measured over a first time span.

12. The computerized method of claim 11, wherein the first time span over which the long-term-average CIR is measured is increased when the absolute value is greater than a first predefined value.

13. The computerized method of claim 12, wherein the first time span over which the long-term-average CIR is measured is decreased when the absolute value is less than the first predefined value.

14. The computerized method of claim 9, further comprising:
adjusting the long-term-average CIR by an amount, delta, wherein:
the long-term-average CIR is adjusted upward by the amount delta when a mathematical difference between the first CQI value and the second CQI value is greater than zero, and
the long-term-average CIR is adjusted downward by the amount delta when the mathematical difference between the first CQI value and the second CQI value is less than zero; and
using the adjusted long-term-average CIR to determine DL BF weights for the secondary RF channel when the absolute value of the difference between the first CQI value and the second CQI value is greater than the predetermined threshold.

15. The computerized method of claim 14, wherein the amount delta is proportional to an estimated signal strength of the primary RF channel, and wherein the estimated signal strength is derived from the first UL SRS received from the UE.

16. The computerized method of claim 14, wherein the amount delta is proportional to a strength of a traffic signal received from the UE on the primary UL channel.

17. A system for estimating an uplink (UL) sounding reference signal (SRS) for a secondary radio-frequency (RF) channel associated with an eNodeB in a carrier aggregation (CA) long-term evolution (LTE) network (the "network"), wherein the eNodeB has at least a primary RF channel having a primary downlink (DL) channel and an associated primary UL channel and the secondary RF channel which only has a secondary DL channel and not an associated secondary UL channel, the system comprising:
a computing device associated with the eNodeB having one or more processors and one or more computer-readable media; and
a data store coupled with the eNodeB;
the eNodeB, wherein the eNodeB is configured to utilize the computing device to estimate the UL SRS, wherein the computing device is configured to:
extract a first channel impulse response (CIR) from a first UL SRS received on the primary UL channel, wherein the first UL SRS is communicated by a user equipment (UE) associated with the network;
determine a long-term-average CIR for the primary RF channel;
initially use the first CIR to determine DL beamforming (BF) weights for the primary RF channel and the secondary RF channel;
receive a first channel quality indicator (CQI) value from the UE for the primary DL channel;
receive a second CQI value from the UE for the secondary DL channel;
determine an absolute value of the difference between the first CQI value and the second CQI value, wherein:
when the absolute value is greater than a predetermined threshold, use the long-term-average CIR of the primary RF channel to determine DL BF weights for the secondary RF channel, and
when the absolute value is less than the predetermined threshold, continue to use the first CIR to determine DL BF weights for the secondary RF channel;
adjust the long-term-average CIR by an amount, delta, wherein:
the long-term-average CIR is adjusted upward by the amount delta when a mathematical difference between the first CQI value and the second CQI value is greater than zero, and
the long-term-average CIR is adjusted downward by the amount delta when the mathematical difference between the first CQI value and the second CQI value is less than zero; and
use the adjusted long-term-average CIR to determine the DL BF weights for the secondary RF channel when the absolute value of the difference between the first CQI value and the second CQI value is greater than the predetermined threshold.

18. The system of claim 17, wherein the eNodeB further has at least a third RF channel which only has a third DL channel and not an associated UL channel.

19. The media of claim 18, wherein the computing device is further configured to:
use the first CIR to determine DL beamforming (BF) weights for the third RF channel;

receive a third CQI value from the UE for the third DL channel; and determine the absolute value of the difference between the first CQI value and the third CQI value, wherein:

when the absolute value of the difference between the first CQI value and the third CQI value is greater than a predetermined threshold, use the long-term-average CR of the primary RF channel to determine DL BF weights for the third RF channel, and when the absolute value of the difference between the first CQI value and the third CQI value is less than the predetermined threshold, continue to use the first CIR to determine DL BF weights for the third RF channel.

20. The system of claim 17, wherein the amount delta is calculated based on at least one of an estimated signal strength of the primary RF channel as derived from the first UL SRS or a strength of a traffic signal received from the UE on the primary UL channel.

* * * * *